July 25, 1939.  P. C. P. BOOTY ET AL  2,167,430
FILMING MACHINE
Filed July 22, 1937  5 Sheets-Sheet 3
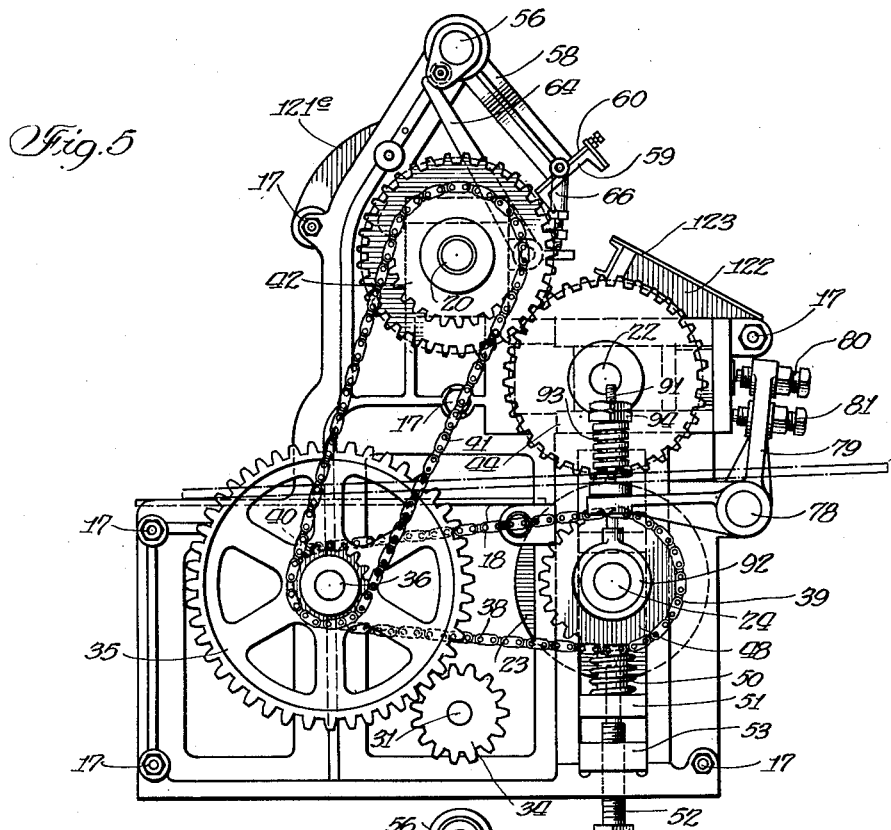
Fig. 5
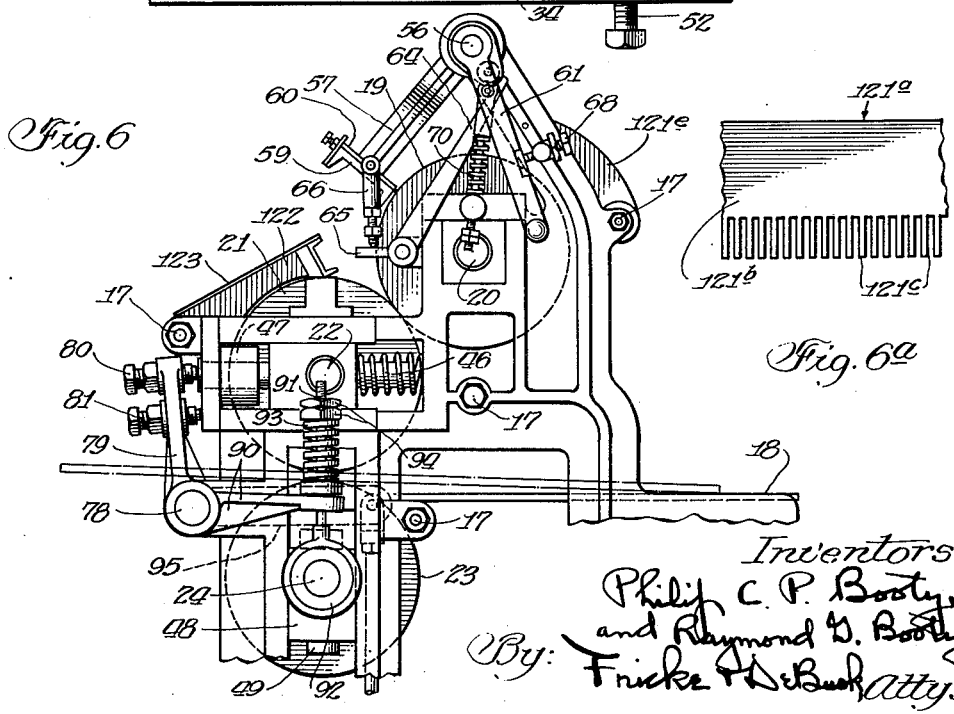
Fig. 6
Fig. 6a
Inventors:
Philip C. P. Booty,
and Raymond G. Booty,
By Fricke & DeBusk Atty's.

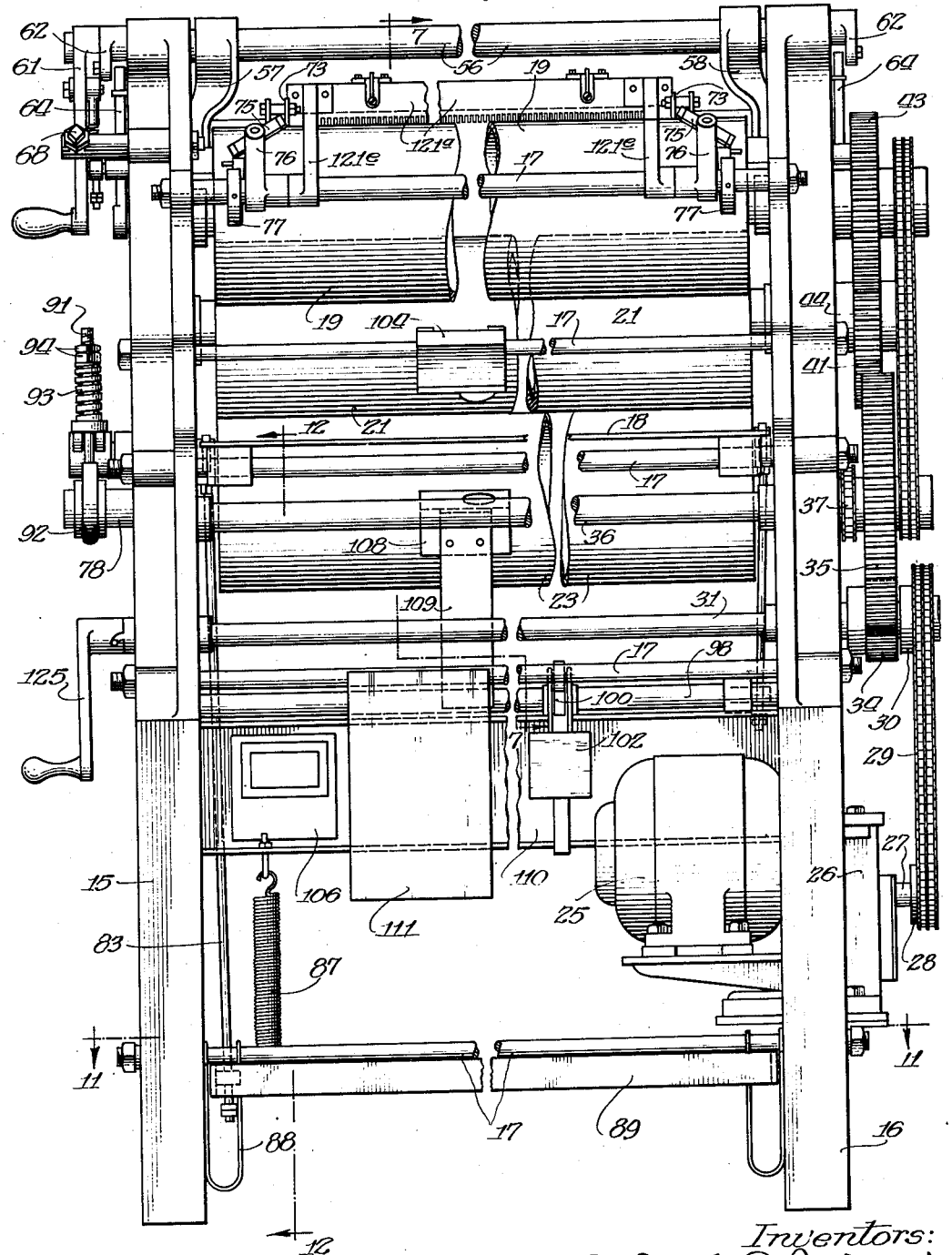

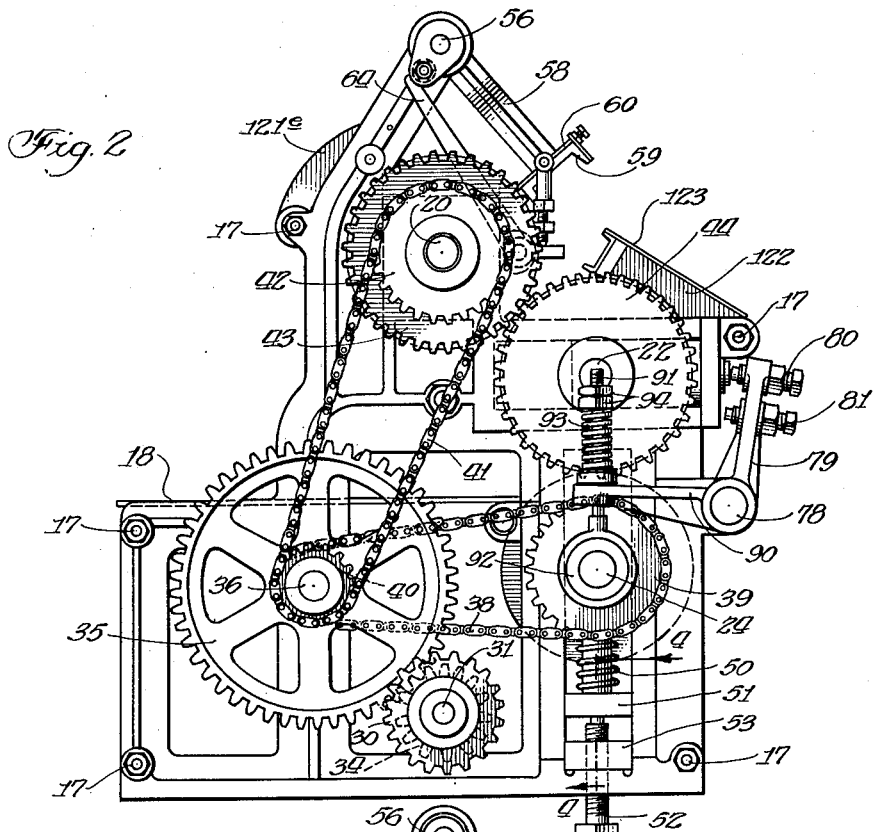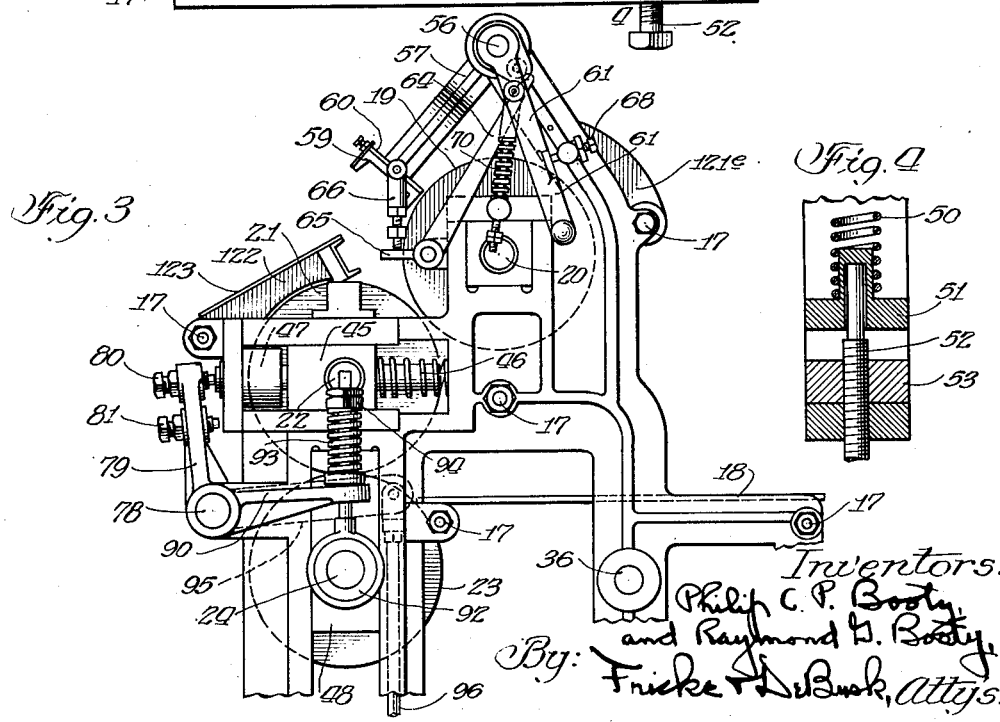

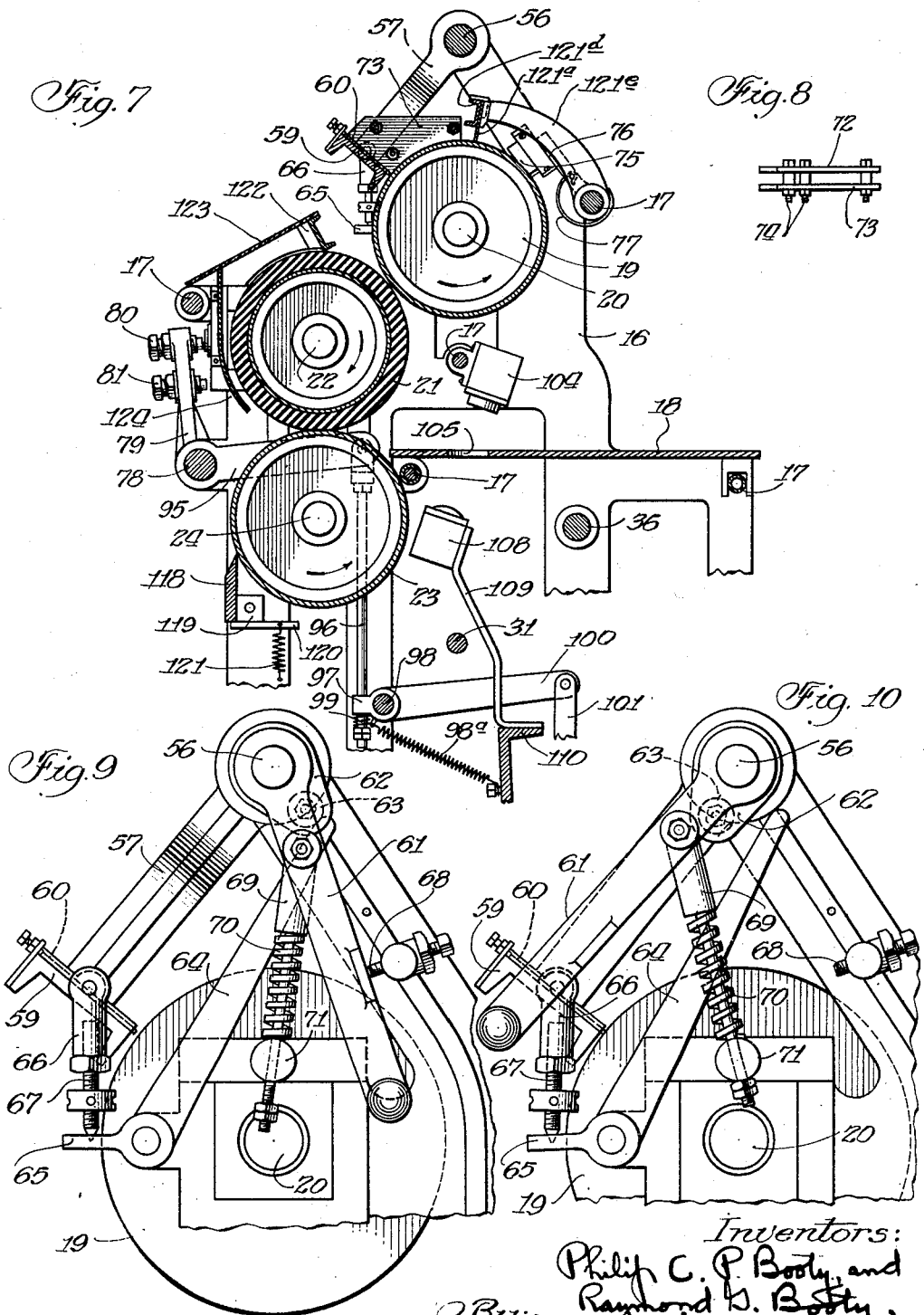

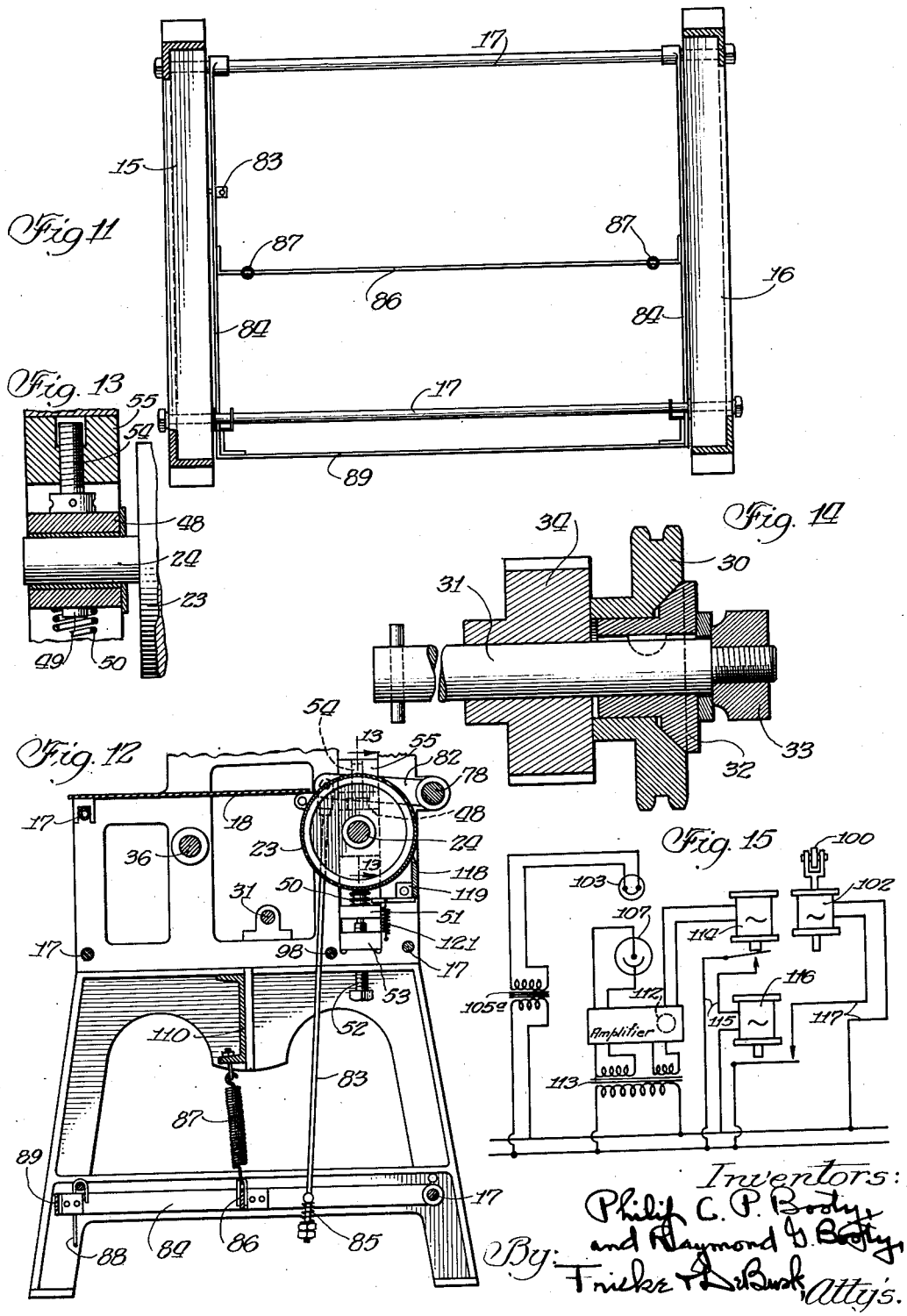

Patented July 25, 1939

2,167,430

UNITED STATES PATENT OFFICE 2,167,430

FILMING MACHINE

Philip C. P. Booty and Raymond G. Booty, Chicago, Ill., assignors, by mesne assignments, to Reichel & Drews, Inc., Chicago, Ill., a corporation of Illinois Application July 22, 1937, Serial No. 155,050

20 Claims. (Cl. 91—50)

Our invention relates to filming machines and has for its object the provision of a new and improved form and arrangement of parts by which a thin coat of synthetic resin may be spread upon the face of a panel of wood or the like for the purpose of bonding such panel with another panel for making a veneered surface or for the formation of ply board or the like. It is one of the principal objects of our invention to provide an improved machine of this type which shall be effective for spreading a film of the resin on a panel and which shall include intermittently acting means controlled by the operator for feeding the resin to the operative portion of a coating roll or other resin applying member so as to enable the operator to make the feed of the resin correspond accurately with the movement of the panel through the machine and thus prevent the deposit of resin on the working parts of the machine while at the same time assuring complete coating of the entire face of the panel.

It is one of the objects of our invention to provide an improved form of reservoir and feeding means for taking resin therefrom, together with an improved form of mechanism for taking resin intermittently from said feeding means for application to a panel. It is another object of our invention to provide improved means in a mechanism of this type for controlling the intermittently acting means for causing the feed of the resin to conform to the movement of the panel through the machine. It is one of our objects to provide control means of this type comprising a lamp and a photoelectric cell, together with cooperating means, by which the intermittent movements of the resin supplying and coating means are controlled automatically in the desired timed relation by the passage of the panel between the lamp and the cell so as to break the light ray. It is still another object of our invention to provide an improved arrangement of parts to be used if desired when fairly thick panels are being coated by which the intermittent movements of the resin supplying and coating means may be controlled by mechanically operating means actuated by direct engagement with the panel in its passage through the machine.

It is another object of our invention to improve mechanisms of this type in sundry details hereinafter pointed out. The preferred means by which we have accomplished our several objects are illustrated in the accompanying drawings and are hereinafter specifically described. That which we believe to be new and desire to cover by Letters Patent is set forth in the claims.

In the drawings,—

Fig. 1 is a front elevation of our improved machine, partially broken away at about its middle portion for clearness of illustration, the electric control means being shown diagrammatically with the connecting cables omitted;

Fig. 2 is an end view of the upper portion of the machine as seen from the right in Fig. 1;

Fig. 3 is an end view of the upper portion of the machine as seen from the left in Fig. 1;

Fig. 4 is an enlarged detail view, being a vertical section taken at line 4—4 of Fig. 2;

Figs. 5 and 6 are views similar to Figs. 2 and 3 respectively but showing changed positions of the working parts;

Fig. 6a is a face view of a fragmentary portion of a comb member mounted adjacent to the top roll;

Fig. 7 is a vertical sectional view taken at line 7—7 of Fig. 1;

Fig. 8 is an enlarged detail view, being a top view of one of the end plate members of the reservoir for the resin;

Fig. 9 is an end view corresponding to a portion of Fig. 3 drawn upon an enlarged scale;

Fig. 10 is a view similar to Fig. 9 but showing a changed position of the parts;

Fig. 11 is a horizontal sectional view taken at line 11—11 of Fig. 1;

Fig. 12 is a vertical sectional view taken at line 12—12 of Fig. 1;

Fig. 13 is an enlarged detail view, being a section taken at line 13—13 of Fig. 12;

Fig. 14 is an enlarged detail view, being a sectional view through the clutch on the end portion of one of the drive shafts of the machine; and Fig. 15 is a diagrammatic view showing the connections of the photoelectric cell with the relays and the power means controlled thereby.

Referring now to the several figures of the drawings, in which corresponding parts are indicated by the same reference characters, 15 and 16 indicate the end frame members of our improved machine oppositely disposed and rigidly connected by a plurality of cross bars 17. A table 18 is also secured in position between said end frame members in horizontal position as is best shown in Fig. 7.

Between the end frame members 15 and 16, we have mounted a cylindrical roll 19 upon a shaft 20, such roll having preferably an outer surface of steel. Positioned diagonally below the roll 19 and to the rear, we have mounted a cylindrical rubber roll 21 by means of a shaft 22, the roll 21 being movable horizontally into and out of engagement with the roll 19. Below the roll 21, we have mounted a second cylindrical steel roll 23 carried by a shaft 24, the roll 23 being movable vertically in the frame toward and from the rubber roll 21. As is best shown in Fig. 7, the roll 21 is located in rear of the table 18 at a slightly higher level as compared with the table.

Means is provided for driving the several rolls through the medium of the shafts upon which they are mounted, such means comprising in the arrangement shown an electric motor 25 supplying power through a speed reduction gear box 26 to a shaft 27 and sprocket pinion 28, such pinion being connected by means of a sprocket chain 29 to a sprocket pinion 30 mounted upon one end of a cross shaft 31 extending between the end frame members 15 and 16. As is clearly shown in Fig. 14, the sprocket pinion 30 is connected with the shaft 31 by means of a cone clutch comprising a cone member 32 which is adapted to be tightened into effective driving engagement with the sprocket pinion 30 by means of a nut 33 secured by means of screw threads upon the end of the shaft. Upon the shaft 31, we have also fixedly mounted a spur pinion 34 which meshes with a spur gear 35 fixedly mounted upon a shaft 36 revolubly mounted between said end frame members 15 and 16. Said shaft 36 in turn is provided with a sprocket pinion 37 which is connected by means of a sproket chain 38 with a sprocket gear 39 mounted upon the shaft 24 of the roll 23 for driving said roll. The shaft 36 is also provided with a sprocket pinion 40 fixedly mounted thereon which is connected by means of a sprocket chain 41 and sprocket gear 42 with the shaft 20 of the roll 19 for driving said roll. Rolls 19 and 21 are operatively connected together by means of intermeshing gears 43 and 44 fixedly mounted upon the shafts 20 and 22 respectively.

By the use of the mechanism as above specified, comprising the sprocket chain 38 in substantially horizontal position, the roll 23 is capable of being moved up and down with respect to the roll 21 without disturbing the driving connections of the parts. In the arrangement shown, the gears 43 and 44 are provided with teeth of such length radially as to enable the gears to mesh effectively both when the roll 21 is in operative engagement with the roll 19 and when said roll 21 has been shifted toward the right in Fig. 2 out of engagement with the roll 19 as hereinafter described. The arrangement is such that the surface speed is exactly the same for all three of the rolls 19, 21 and 23.

The means for mounting the roll 21 so as to be movable horizontally upon the framework comprises bearing blocks 45 slidably mounted in the framework at opposite ends of the machine (see Fig. 3), heavy coiled springs 46 being provided between the bearing blocks and the framework tending normally to hold the roll 21 at the limit of its movement backwardly toward the left in Fig. 3. At the rear faces of the bearing blocks 45, we have provided pins 47 slidably mounted in the framework and normally extending outwardly beyond the rear face of the frame, as is clearly shown in Fig. 3.

The means for mounting the cylindrical roll 23 so as to be movable up and down comprises bearing blocks 48 slidably mounted in the framework at opposite ends of the machine, within which bearing blocks the shaft 24 is mounted, (see Fig. 13). On the lower face of each of the bearing blocks 48, we have provided a lug 49 upon which a heavy coiled spring 50 is mounted, such coiled spring 50 at its lower end bearing against a vertically adjustable block 51 which is movable upwardly by means of a heavy set screw 52 which is mounted by means of screw threads in a fixed block 53 of the framework, (see Figs. 2 and 4). As will be readily understood, by a vertical adjustment of the set screw 52, the tension of the spring 50 can be regulated as desired. As is also best shown in Fig. 13, a second heavy set screw 54 is mounted by means of screw threads in a fixed block 55 above the bearing block 48, the screw 54 being adjustable downwardly for forcing the bearing block 48 downwardly against the action of the spring 50 for holding the cylinder 23 in the desired downwardly spaced relation with respect to the cylindrical roll 21.

Means is provided in connection with the roll 19 for holding a supply of synthetic resin or other suitable glue so as to be capable of being spread evenly upon the surface of said roll. This means comprises a rock shaft 56 journaled between the end frame members 15 and 16. Upon said shaft, we have loosely mounted arms 57 and 58 between which we have mounted a cross bar 59 upon which is adjustably mounted a plate 60 which normally bears at its lower edge on the surface of the roll 19. Upon the end of the shaft 56 at the left in Fig. 1, we have mounted a lever 61 for rocking the shaft, and upon each end of the shaft we have mounted a short arm 62 so as to swing with the lever. Upon the lower ends of the arms 62, we have mounted rollers 63 in position to engage levers 64 pivotally mounted upon the framework at opposite ends of the machine, each of the levers 64 being provided with a rearwardly extending lug 65 in substantially horizontal position thereon. Links 66 pivotally mounted upon the ends of the cross bar 59 engage at their lower ends the lugs 65 so that upon swinging movement of the levers 64 and lugs 65 the plate 60 is moved upwardly and rearwardly a very slight distance into spaced relation with respect to the surface of the roll 19. The arrangement is such that when the lever 61 is swung to its rearmost position as shown in Fig. 10 the plate 60 is in engagement with the roll 19 and that when the lever 61 is swung to the limit of its motion forwardly the levers 64 are actuated by the rollers 63 for forcing the links 66 upwardly so as to carry the plate 60 slightly out of engagement with the roll. In the arrangement shown, the links 66 comprise pins 67 adjustably mounted by means of screw threads in the body portions of the links for adjusting the effective length of the link. The forward movement of the lever 61 is limited by a set screw 68 adjustably mounted in position by means of screw threads. The lever 61 is held yieldingly at either the forward or the backward limit of its motion by means of a link 69 and spring 70 which are connected with the framework at 71 in such relation as to move past centers at an intermediate point in the movement of the lever 61 from one extreme position to the other.

By the arrangement above described, the plate 60 serves with the roll 19 to provide a trough within which a supply of glue is adapted to be held, such glue being supplied to the trough from any suitable source not shown. End plate units are located in the trough and adjustable therealong for preventing the glue from escaping at the ends of the trough, such end plate units being adapted to support themselves in any adjusted positions along the trough, being fitted very accurately both to the face of the roll and to the plate 60. In the arrangement shown, each of the end plate units comprises two end plates 72 and 73 connected together in suitably spaced relation to each other by means of bolts 74, (see Fig. 8).

The arrangement as above described is such that when a quantity of glue is maintained in the trough formed by the plate 60 and the roll 19, the plate 60 serves to prevent the escape of any of the glue when the roll 19 is rotated in counter-clockwise direction in Fig. 7 when the plate is in engagement with the roll. When, however, the lever 61 is swung from the position as shown in Fig. 10 to the position as shown in Fig. 9 so as to raise the plate 60 slightly out of engagement with the face of the roll 19 a thin film of glue is progressively applied to the face of the roll as it rotates in counter-clockwise direction in said Fig. 7. When during such rotation the roll 21 is in spaced relation to the roll 19, the film remains undisturbed about said roll 19, the glue being redeposited at each rotation again in the reservoir. The arrangement is such that the plate 60 causes the film of glue to remain at all times of the same uniform thickness and prevents any tendency for the glue to harden or to form a crust upon the surface of the roll. As will be readily understood, the film of glue is being renewed and replaced constantly and is being worked mechanically by the passage of the film through the trough and past the plate 60.

For preventing the spreading of the glue longitudinally of the roll 19 beyond the desired limits, we have provided scrapers 75 which are mounted in oblique position upon the face of the roll 19 at the outer edges of the film of glue upon the roll, the scrapers having a tendency to deflect the outer edge portions of the ribbon of glue inwardly toward the middle of the roll. In the arrangement shown, the scrapers 75 are carried by arms 76 which are loosely mounted upon one of the brace bars 17 in front of the roll 19. Springs 77 connected with the arms 76 and with the shaft 17 press the scrapers yieldingly against the face of the roll so as to make them effective for their purpose as above described. The arms 76 and springs 77 are adjustable lengthwise of the brace bar 17 so as to hold the scrapers in the desired operative position at the edge of the pattern of glue corresponding to the position of the end plate units of the trough.

In the operation of our improved machine, a panel is fed from the right in Fig. 7 to the rolls 21 and 23 which are rotating in opposite directions so as to cooperate for drawing the panel toward the left. In order that the glue carried by the roll 19 shall be deposited on the panel as it passes through the machine, the roll 21 must be moved toward the right into engagement with the roll 19, such movement of the roll 21 toward the right being regulated and timed so that the leading end of the film of glue transferred from the roll 19 to the roll 21 shall arrive at the bite of the rolls 21 and 23 at the same instant when the forward edge of the panel arrives at that point so as to insure that the entire top face of the panel shall be coated with the glue and that no part of such film of glue on the roll 21 shall be applied to the surface of the roll 23 before the panel engages the roll 21. Means is provided accordingly for effecting the movement of the roll 21 toward the right in Figs. 6 and 7 against the action of the springs 46, the machine as illustrated being provided with three different cooperating instrumentalities for this purpose.

Across the machine from the end frame member 15 to the end frame member 16 we have mounted a rock shaft 78 a short distance to the rear and below the shaft 22 of the roll 21, such shaft having arms 79 fixedly mounted thereon at opposite ends of the machine. At their upper ends, the arms 79 are provided with set screws 80 in position to engage the rear ends of the pins 47 bearing on the bearing blocks 45 of the shaft 22 so that upon rocking movement of the shaft 78 in clockwise direction in Fig. 3, the set screws shall engage the pins so as to force the roll 21 forwardly into engagement with the roll 19. For limiting the forward movement of the arms 79, we have provided set screws 81 in position to engage the adjacent framework so that by an adjustment of said screws the forward movement of the roll 21 can be controlled. Upon the rock shaft 78 adjacent to the end frame member 15, we have rigidly mounted an arm 82 to the forward end of which we have pivotally connected a link 83 which is connected at its lower end with one of the side arm portions 84 of a foot lever which is pivotally mounted upon one of the cross rod members 17 as is best shown in Fig. 12. In the arrangement shown, the link 83 is provided with a coiled spring 85 thereon at its lower end for cushioning the connection between the shaft 78 and the foot lever. A cross bar 86 is provided also from one arm 84 to the other (see Fig. 11), such cross bar being connected by coiled springs 87 with a portion of the framework above the foot lever for normally holding the foot lever in its raised position. Clips 88 are mounted on the cross rod 17 at the front of the machine beneath the side arms 84 of the foot lever for limiting the downward movement of the lever. The forward ends of the side arms 84 are connected together by means of a cross bar 89 in position to be engaged readily by the foot of the operator in position in front of the machine for giving the lever an operative downward stroke. As will be readily appreciated, upon a downward stroke of the foot lever as above described, the shaft 78 is given a rocking movement in counter-clockwise direction in Figs. 12 and 2 for forcing the roll 21 into engagement with the roll 19.

Another means for effecting the desired movement of the roll 21 into engagement with the roll 19 is provided in connection with the vertically movable roll 23. Such means comprises arms 90 rigidly mounted upon opposite ends of the rock shaft 78 connected at their forward ends with the end portions of the shaft 24 of the roll 23. In the arrangement shown, tie rods 91 are employed connected at their lower ends with the shaft 24 by means of rings 92 and connected at their upper ends with the arms 90 with heavy coiled springs 93 interposed between said arms and the end portions of the tie rods. By the use of this arrangement, when the roll 23 is moved downwardly by the reception of a panel between the rolls 21 and 23 a pull is exerted upon the arms 90 through the springs 93 for rocking the rock shaft 78 in clockwise direction in Fig. 3 for forcing the roll 21 toward the right in said figure into engagement with the roll 19. In the construction illustrated, the springs 93 are connected with the tie rods 91 by means of nuts 94 secured by means of screw threads on the pins whereby the connections between the roll 23 and the arms 90 can be adjusted to conform with the adjustment of the set screws 52 and 54 by which the normal position of the roll 23 is adjusted to suit different thicknesses of panel.

A third means for effecting the desired movement of the roll 21 into engagement with the roll 19 comprises an arm 95 fixedly mounted upon the rock shaft 78 adjacent to the end frame member 16, as is best shown in Fig. 7, said arm having a link 96 pivotally connected with its forward end, the link at its lower end being connected with a short arm 97 extending from the rear face of a rock shaft 98 journaled in cross position upon the framework below the roll 23. In the arrangement shown, the link 96 is provided with a coiled spring 99 thereon which affords a cushioned connection between the link and the arm. At an intermediate point, the rock shaft 98 is provided with a forwardly extending arm 100 fixedly mounted thereon, the plunger 101 of a power solenoid 102 being pivotally connected to the forward end of the arm 100 as is best shown in Fig. 7. A spring 98a is connected between the shaft 98 and a portion of the framework of the machine for applying tension upon the shaft in the direction for turning it in counter-clockwise direction in Fig. 7, being preferably of such effective strength as to balance the weight of the plunger. The means for operating the power solenoid 102 comprises a lamp 103 (see Figs. 7 and 15) enclosed in a casing 104 mounted above an opening 105 through the table 18 in position to direct the ray from the lamp through said opening. In the arrangement shown the lamp 103 is connected with a transformer 105a mounted in a casing 106, the transformer being connected with a suitable source of alternating current. Beneath the opening 105 in the table 18 we have provided a photoelectric cell 107 housed in a casing 108 mounted upon a bracket 109 rising from a cross bar 110 of the framework, the photoelectric cell being in position to receive the light ray from the lamp 103 after its passage through the opening 105. The cell 107 is connected with amplifier means mounted in a casing 111, such amplifier means in the arrangement shown comprising an amplifier tube 112 and transformer means 113 arranged for providing the required current for the tube 112. The amplifier tube in turn is connected with the winding coil of an A. C. relay 114 arranged when energized to open a circuit 115 connecting the winding coil of an A. C. relay 116 with a suitable source of power. The arrangement further is such that the relay 116 serves when energized to close a circuit 117 connecting the power solenoid 102 with a suitable source of power.

Means is provided for scraping any surplus glue which may be deposited upon the roll 23 from its surface, such means comprising a scraper blade 118 engaging the rear face of the roll 23, such blade being mounted upon mounting blocks 119 which are pivotally mounted upon the framework, arms 120 and springs 121 being connected with said mounting blocks for pressing the blade 118 yieldingly against the face of the roll.

We have found in practice that in the use of our machine for coating panels of some types of wood there is a tendency for the accumulation of sawdust and splinters or the like on the rolls and a tendency for the transfer of the particles to the glue receptacle between the plate 60 and the cylinder 19. In order to prevent the deposit of such particles in the glue receptacle and thus to prevent the clogging of the film space, between the edge of the plate and the face of the cylinder or roll, we have provided a combing device 121a which is supported with the ends of the teeth in contact with the face of the roll so as to catch and prevent the forward movement of the particles. In the arrangement shown, our combing device is made from a plate 121b of sheet metal cut out along its lower edge to provide teeth 121c.

In the form of device as shown, the comb 121a is rigidly mounted on the face of a channel bar 121d which is supported movably in position on the ends of two arms 121e which are arranged to swing about the cross bar 17, as is best shown in Fig. 7, with the comb 121a extending longitudinally of the roll. Whenever it is necessary or desirable to clean the combing device in order to clear away the mass of collected sawdust and the like, the comb is swung about the cross bar 17 toward the right in Fig. 7 so as to make the face of the comb readily accessible for facilitating the use of a scraper thereon. We have found that our combing device is very effective for preventing the dirt from entering the glue receptacle.

At the rear face of the machine, a guard is provided adjacent to the roll 21, such guard being in the form of a rectangular frame 122 mounted upon one of the brace rods 17 so as to be adapted to swing into and out of operative position as shown in Fig. 7. Upon the upper face of the frame 122, we have mounted a shield 123 in the form of a sheet of Celluloid or other transparent material, the sheet 123 being adapted to engage the upper edge of a sheet metal shield 124 extending along the rear face of the roll 21. By the use of the shielding means comprising the parts 123 and 124, as shown in Fig. 7, any resin on the surface of the roll 21 is protected against the influence of air currents.

With the parts adjusted to suit the thickness of panels to be run through the machine, and with a suitable supply of synthetic resin or other glue being fed to the reservoir provided by the plate 60 and the roll 19, with the arm 61 swung toward the front for holding the plate 60 in slightly spaced relation to the roll 19, and with the electrical apparatus comprising the lamp 103 and the photoelectric cell 107 and their connections all in operation, and with the motor operating to drive the roll 19 in clockwise direction in Fig. 2, a panel is placed upon the table 18 and pushed forward thereon to bring its forward edge underneath the lamp 103 to intercept the light ray from the lamp to the photoelectric cell 107. Promptly upon such interception of the ray, the relay 114 is deenergized so as to connect the relay 116 for energization, which in turn connects the power solenoid 102 with a source of power so as to move the arm 100 upwardly for drawing the link 96 and the arm 95 downwardly so as to give the arm 79 an operative stroke in clockwise direction in Fig. 7 for moving the roll 21 into engagement with the roll 19. As soon as such engagement takes place, the progressive application of a film of the glue upon the roller 21 begins, such film advancing with the roll 21 in clockwise direction in Fig. 7. When the forward edge of the film reaches the bite of the rolls 21 and 23, the panel is pressed manually by the operator into the bite of the rolls for taking the film of glue from the roll 21 upon the top face of the panel, the operator being able, after a little work with the machine, to time the forward movement of the panel accurately for obtaining the desired results. This application of glue to the panel passing through the machine continues until the rear edge of the panel passes beyond the lamp 103 so as to permit the ray from the lamp again to impact the photoelectric cell 107. As soon as the panel clears the opening 105 so as to reestablish the ray of light from the lamp upon the cell, the relay 114 is reenergized so as to open the circuit through the relay 116 for deenergizing such relay and permitting the circuit through the power solenoid to be opened, whereupon the springs 46 serve promptly to force the roll 21 toward the left in Fig. 3 out of engagement with the roll 19. The lamp 103 and cell 107 are so located that when the roll 21 passes out of engagement with the roll 19 the roll 21 is still provided with a film of glue part way around the roll, the scope of such film corresponding to the then uncoated rear end portion of the panel, with the result that the film of glue as applied by the roll 21 extends to the rear end of the panel and the roll 23 is prevented from taking any glue from the roll 21.

In the operation as above described, when the panel passes into the bite of the rolls 21 and 23, the roll 23 is forced downwardly to a slight extent so as to have a tendency to rock the shaft 78 in the direction for forcing the roll 21 into engagement with the roll 19. As will be readily understood, such tendency to move the roll 21 or to hold it in displaced position against the action of the springs 46 continues as long as the panel is in position between the rolls 21 and 23 and until after the rear edge of the panel has passed the lamp 103. In case the panel being worked upon is of comparatively great thickness as compared with the ordinary sheet of veneer, which is ordinarily not more than three thirty-seconds of an inch in thickness, and often is much thinner, the roll 21 is held by such comparatively thick panel from movement out of engagement with the roll 19 until the panel has passed out of the bite of the rolls 21 and 23. If, however, the panel is of the ordinary veneer thickness, the lost play between the operative parts of the train of mechanism is sufficient for enabling the springs 46 to push the roll 21 out of engagement with the roll 19 promptly as soon as the opening 105 is cleared by the panel in spite of the presence of such thin panel between the rolls. It is clear accordingly that when a single ply of veneer of usual thickness is being coated the automatic control by the photoelectric cell and its cooperating parts is not interfered with by the mechanical means actuated by the downward movement of the roll 23. When a panel of a thickness substantially greater than the normal veneer thickness is being coated, the roll 21 is held in engagement with the roll 19 until the panel passes out of the bite of the rolls 21 and 23. In such case, the film of the glue remaining on the roll 21 after the panel has passed is applied to the roll 23 part way about said roll, but such film is promptly removed from the roll 23 by the action of the scraper blade 118. From the above it is seen that when the photoelectric cell is in operation and when thick panels are being coated, the electrically controlled means serves to move the roll 21 into contact with the roll 19 for taking the glue while the mechanically operating means controls the movement of the roll 21 away from the roll 19.

When operating upon comparatively thick panels, the electrical controlling means may be thrown out of operation if desired. In that case the roll 21 would be moved into engagement with the roll 19, when a panel is in position ready to enter the bite of the rolls 21 and 23, through the action of the foot lever comprising the cross bar 89.

When the use of our improved machine is to be discontinued for a substantial period, the resin is very easily and quickly removed from the reservoir, the end plates 73 being merely slid into close engagement with each other for minimizing the work of removal of the glue from the reservoir. When the machine is being cleaned after operation, a crank handle 125 is applied upon one end of the shaft 31 as shown in Fig. 1, and the nut 33 of the clutch apparatus in connection with said shaft is loosened so as to permit the ready rotation of the parts by hand.

We have found in the use of our improved machine that it is very effective for applying a film of glue over the entire surface of a panel and that in the use of the machine there is no appreciable tendency for the synthetic resin to pile up in the form of a crust upon the working parts. We have found that the operation of the machine is very effective in every way and that the operation of applying veneers or forming ply board is very greatly facilitated and cheapened so as to be highly useful in competition with methods heretofore in use. We have found that the distribution of the resin as applied by our machine is so uniform and so effective throughout the entire area being acted upon that a superior bonding is secured.

While we prefer to employ the form of apparatus as shown in our drawings and as above described, it is to be understood that our invention is not limited thereto except so far as it is so limited by the claims, it being obvious that changes might well be made in the arrangement without departing from our invention.

We claim:

1. In a filming machine, the combination of a revoluble member, means for moving a panel past said revoluble member in operative engagement therewith, and means controlled by the forward movement of a panel past said revoluble member for spreading a film of glue on said revoluble member for transfer to the panel as it moves through the machine.

2. In a filming machine, the combination of a revoluble member, means for moving a panel past said revoluble member in operative engagement therewith, and means for spreading a film of glue on said revoluble member for transfer to the panel as it moves through the machine comprising means controlled by the movement of the front edge portion of the panel into the machine for rendering the glue delivery means operative and controlled by the movement of the rear edge portion of the panel past a predetermined critical point for stopping the delivery of the glue.

3. In a filming machine, the combination of a revoluble member, means for moving a panel past said revoluble member in operative engagement therewith, means for spreading a film of glue on said revoluble member for transfer to the panel as it moves through the machine, a relay, means controlled by said relay for throwing said film spreading means into and out of operation, and means controlled by the passage of a panel of ordinary veneer thickness through the machine for energizing and deenergizing said relay in timed relation to the forward movement of the panel so as to cause delivery of glue to said revoluble member to terminate at a point thereon corresponding to the position of the rear end of the panel.

4. In a filming machine, the combination of a revoluble member, means for moving a panel past said revoluble member in operative engagement therewith, means for spreading a film of glue on said revoluble member for transfer to the panel as it moves through the machine, a light bulb on one side of the path of the panel, a photoelectric cell on the opposite side of said path, means comprising a relay connected with said photoelectric cell so as to be energized and deenergized in timed relation to the interception of the ray of light from the bulb to the cell by the passage of the panel, and means controlled by said relay for throwing said film spreading means into and out of operation.

5. In a filming machine, the combination of a revoluble member, means controlled by the forward movement of a panel past said revoluble member for spreading a film of glue on the revoluble member for transfer to the panel as it moves through the machine, a second revoluble member normally positioned yieldingly in the path of the panel past said first named revoluble member, and means actuated by the displacement of said second revoluble member by engagement with said panel for throwing said film spreading means into and out of operation.

6. In a filming machine, the combination of a frame, a member revolubly mounted thereon, means for applying a film of glue to said revoluble member progressively as it revolves, a second member revolubly mounted in said frame and movable therein into and out of engagement with said first named revoluble member for transferring the film of glue to said second revoluble member, means for moving a panel past said second revoluble member in operative engagement therewith, and means controlled by the forward movement of a panel of ordinary veneer thickness past said second revoluble member for moving said second revoluble member alternatively into and out of engagement with said first named revoluble member in such timed relation as to limit the application of the glue to such face portions of said second revoluble member as to cause such delivery of glue to said second revoluble member to terminate at the point thereon corresponding to the then position of the rear end of said panel.

7. In a filming machine, the combination of a frame, a roll rotatably mounted in said frame, means for applying a film of glue to said roll progressively as it rotates, a second roll rotatably mounted in bearings movable horizontally in said frame for bringing the second roll alternatively into and out of engagement with the first named roll for transferring the film of glue to said second roll, means for moving a panel past said second roll in operative engagement therewith for taking the glue therefrom, and means controlled by the forward movement of a panel of ordinary veneer thickness past said second roll for moving said bearings toward and from said first named roll for moving the second roll alternatively into and out of engagement with said first named roll in such timed relation as to cause the application of glue to said second roll to terminate at the point on said second roll corresponding to the then position of the rear end of said panel.

8. In a filming machine, the combination of a frame, a roll rotatably mounted in said frame, means for applying a film of glue to said roll progressively as it rotates, a second roll rotatably mounted in bearings movable horizontally in said frame for bringing the second roll alternatively into and out of engagement with the first named roll for transferring the film of glue to said second roll, means for moving a panel past said second roll in operative engagement therewith for taking the glue therefrom, a rock shaft mounted in said frame adjacent to said second roll, means comprising arms carried by said rock shaft adapted upon rocking movement of the shaft to move said bearings toward and from said first named roll for moving the second roll alternatively into and out of engagement with the first named roll, and means controlled by the forward movement of a panel of ordinary veneer thickness past said second roll for rocking said rock shaft in such timed relation as to cause the application of the glue from the first named roll to the second roll to terminate at the point on said second roll corresponding to the then position of the rear end of said panel.

9. In a filming machine, the combination of a frame, a member revolubly mounted thereon, means for applying a film of glue to said revoluble member progressively as it revolves, a second member revolubly mounted in said frame and movable therein into and out of engagement with said first named revoluble member for transferring the film of glue to said second revoluble member, means for moving a panel past said second revoluble member in operative engagement therewith, means controlled by the forward movement of a panel of ordinary veneer thickness past said second revoluble member for moving said second revoluble member alternatively into and out of engagement with said first named revoluble member in such timed relation as normally to cause the application of the glue from the first named revoluble member to the second revoluble member to terminate at the point on said second roll corresponding to the then position of the rear end of said panel, and lever means operable independently of the movement of the panel for moving said second revoluble member into engagement with said first named revoluble member.

10. In a filming machine, the combination of a frame, a cylindrical roll mounted in transverse position on said frame, two arms pivotally mounted above said roll and extending obliquely downwardly and toward one side of the roll, a plate connected with the lower end portions of said arms in position to press evenly by its own weight and by the weight of said arms on said roll and extending outwardly from the roll so as to serve therewith to provide a trough, cross plate members closing the space between the plate and the roll for enabling the trough to hold a supply of glue, and means for moving said first named plate into evenly spaced relation to said roll at the start of the operation of the machine for permitting a film of glue to be applied progressively to the surface of said roll as it revolves.

11. In a filming machine, the combination of a frame, a roll rotatably mounted in transverse position on said frame, a bar extending longitudinally of the roll, a plate adjustably mounted on said bar in position to press evenly at its lower edge on said roll and extending outwardly from the roll so as to serve with the roll to provide a trough for holding a supply of glue, a lever swingingly mounted on said frame, cams movably mounted on said frame at opposite ends of the machine and connected with said lever so as to be moved therewith, two other levers pivotally mounted on said frame at opposite ends of the machine adjacent to said plate and movable by said cams respectively, and adjustable connections between said other levers and said bar adapted upon an operative stroke of said first named lever in one direction to move said plate into slightly spaced relation to the surface of said roll for permitting a film of glue to be applied progressively to the face of the roll as it revolves.

12. In a filming machine, the combination of a frame, a roll rotatably mounted in transverse position on said frame, a bar extending longitudinally of the roll, a plate adjustably mounted on said bar in position to press evenly at its lower edge on said roll and extending outwardly from the roll so as to serve with the roll to provide a trough for holding a supply of glue, a lever swingingly mounted on said frame, cams movably mounted on said frame at opposite ends of the machine and connected with said lever so as to be moved therewith, two other levers pivotally mounted on said frame at opposite ends of the machine adjacent to said plate and movable by said cams respectively, links pivotally connected with said bar at opposite end portions thereof in position to engage said other levers for moving said plate into slightly spaced relation to the surface of said roll upon an operative stroke of said first named lever in one direction, and means for adjusting the effective length of said links for controlling the spacing of said plate with respect to the face of the roll.

13. In a filming machine, the combination of a frame, a member revolubly mounted in transverse position in said frame and having at least one end portion rounded into concentric form, a plate in position to press evenly at its lower edge on said concentric portion of said revoluble member as the member revolves and extending outwardly from the member so as to serve with the member to provide a trough, cross plate members fitted in the trough for enabling it to hold a supply of glue, movable means adapted by an operative stroke in one direction to move said first named plate into evenly spaced relation to said revoluble member for permitting a film of glue to be applied progressively to the downwardly moving surface portion of the member as it revolves, and diagonally positioned scrapers yieldingly mounted on said frame in position to press on said revoluble member at its upwardly moving surface portion at opposite end portions thereof opposite said cross plate members serving to deflect inwardly on the revoluble member the edge portions of the pattern of glue on the member.

14. In a filming machine, the combination of a frame, a roll rotatably mounted on said frame, means for applying a film of glue to said roll progressively as it rotates, a second roll rotatably mounted on said frame so as to be movable horizontally into and out of engagement with said first named roll for transferring the film of glue to said second roll, a third roll resiliently supported on said frame below said second roll so as to press a panel yieldingly against said second roll for movement of the panel through the machine, and means controlled by movement of a panel horizontally through the machine and between said second and third rolls for moving said second roll horizontally into operative engagement with said first named roll.

15. In a filming machine, the combination of a frame, a roll rotatably mounted on said frame, means for applying a film of glue to said roll progressively as it rotates, a second roll rotatably mounted on said frame so as to be movable horizontally into and out of engagement with said first named roll for transferring the film of glue to said second roll, a third roll resiliently supported on said frame below said second roll so as to press a panel yieldingly against said second roll for movement of the panel through the machine, and levers actuated by the downward movement of said third roll for pressing said second roll horizontally into operative engagement with said first named roll.

16. In a filming machine, the combination of a frame, a roll rotatably mounted on said frame, means for applying a film of glue to said roll progressively as it rotates, a second roll rotatably mounted on said frame so as to be movable horizontally into and out of engagement with said first named roll for transferring the film of glue to said second roll, a third roll resiliently supported on said frame below said second roll so as to press a panel yieldingly against said second roll for movement of the panel through the machine, bell crank levers pivotally mounted on said frame, means actuated by the downward movement of said third roll for giving said levers an operative stroke, and means actuated by an operative stroke of said levers for moving said second roll horizontally into operative engagement with said first named roll.

17. In a filming machine, the combination of a frame, a roll rotatably mounted in said frame, means for applying a film of glue to said roll progressively as it rotates, a second roll rotatably mounted in said frame so as to be movable horizontally into and out of engagement with said first named roll for transferring the film of glue to said second roll, a third roll resiliently supported in said frame below said second roll so as to press a panel yieldingly against said second roll for movement thereby through the machine, and a scraper plate yieldingly pressed against the side face of said third roll for stripping glue from the surface of the roll.

18. In a filming machine, the combination of a frame, a roll rotatably mounted in said frame, means for applying a film of glue to said roll progressively as it rotates, a second roll rotatably mounted in said frame so as to be movable horizontally into and out of engagement with said first named roll for transferring the film of glue to said second roll, a third roll revolubly mounted in bearings movable up and down in said frame below said second roll, adjustable spring means for pressing said bearings upwardly for causing said second and third rolls to grip a panel for carrying it through the machine, and positively acting means for holding said third roll spaced downwardly in adjusted position with respect to said second roll for enabling said two rolls to receive panels of different thicknesses readily between them.

19. In a filming machine, the combination of a frame, a roll rotatably mounted in said frame, means for applying a film of glue to said roll progressively as it rotates, a second roll rotatably mounted in said frame so as to be movable horizontally into and out of engagement with said first named roll for transferring the film of glue to said second roll, means for moving a panel past said second roll in operative engagement therewith for taking the glue therefrom, a guard in the form of a frame member pivotally mounted in position to be swung back over said second roll into proximity to the point of engagement of said two rolls, and shield means carried partly by the machine frame and partly by said pivoted frame member for protecting the film of glue on said second roll from the influence of air currents prior to the deposit of the glue on a panel.

20. In a filming machine, the combination of a revoluble member, means for moving a panel past said revoluble member in operative engagement therewith, means for spreading a film of glue on said revoluble member for transfer to the panel as it moves through the machine, a light bulb on one side of the path of the panel, a photoelectric cell on the opposite side of said path, means for amplifying the current from said cell, a sensitive relay having its winding coil connected with said amplifying means so as to be operated by the current therefrom in the same timed relation as that in which the ray of light from the bulb to the cell is intercepted, a circuit connected with a source of energy for carrying a small current through said relay when closed, a second relay having its winding coil connected in said circuit, a second circuit connected with a source of energy for carrying a comparatively much larger current through said second relay when closed, and means comprising a power solenoid connected with said second circuit for throwing said film spreading means into and out of operation.

PHILIP C. P. BOOTY.
RAYMOND G. BOOTY.